(12) United States Patent
Izawa

(10) Patent No.: US 6,837,994 B2
(45) Date of Patent: Jan. 4, 2005

(54) WATER TREATMENT APPARATUS

(75) Inventor: Yoshinobu Izawa, 1-9-12 Kasuga-cho, nerima-ku, Tokyo 179-0074 (JP)

(73) Assignees: Yoshinobu Izawa, Tokyo (JP); Akehiko Yamazaki, Tokyo (JP)

( * ) Notice: Subject to any disclaimer, the term of this patent is extended or adjusted under 35 U.S.C. 154(b) by 0 days.

(21) Appl. No.: 09/928,396

(22) Filed: Aug. 14, 2001

(65) Prior Publication Data

US 2002/0020674 A1 Feb. 21, 2002

(30) Foreign Application Priority Data

Aug. 21, 2000 (JP) ........................................ 2000-249265

(51) Int. Cl.$^7$ ................................................. C02F 1/52
(52) U.S. Cl. .................... 210/242.1; 137/546; 137/571; 210/170; 210/201; 210/219; 210/257.1; 210/258; 210/523; 232/43.3
(58) Field of Search ................................. 137/544, 546, 137/571, 576; 210/97, 109, 121, 122, 123, 124, 170, 198.1, 209, 219, 236, 241, 242.1, 256, 257.1, 257.2, 258, 297, 354, 355, 359, 513, 521, 523, 201; 232/43.3; 366/341, 184, 189

(56) References Cited

U.S. PATENT DOCUMENTS

| | | | | | |
|---|---|---|---|---|---|
| 3,572,506 | A | * | 3/1971 | Bandy et al. | 210/86 |
| 3,653,395 | A | * | 4/1972 | Chapman | 137/209 |
| 3,701,428 | A | * | 10/1972 | Lesh | 210/170 |
| 3,813,704 | A | * | 6/1974 | Troiano | 4/499 |
| 4,909,932 | A | * | 3/1990 | Monnet | 210/98 |
| 5,785,865 | A | * | 7/1998 | Salis | 210/747 |
| 6,368,498 | B1 | * | 4/2002 | Guilmette | 210/123 |
| 6,451,206 | B1 | * | 9/2002 | Charbonneau | 210/170 |

* cited by examiner

Primary Examiner—Peter A. Hruskoci
(74) Attorney, Agent, or Firm—Duane Morris LLP

(57) ABSTRACT

The special features of the water treatment apparatus in the present invention are that a tank fitted with a raw water inlet and a treated water outlet on the upper part, has within said tank an upper chamber and lower chamber which divide said tank into two sections, upper and lower, and is fitted with a separating wall which can be raised and lowered to adjust the water level in said upper and lower chamber, the upper chamber above said separating wall and the lower chamber below said separating wall both being filled with water. By use of this apparatus, a novel water treatment apparatus is provided which can be extremely easily assembled into a water treatment facility.

9 Claims, 18 Drawing Sheets

FIG 1
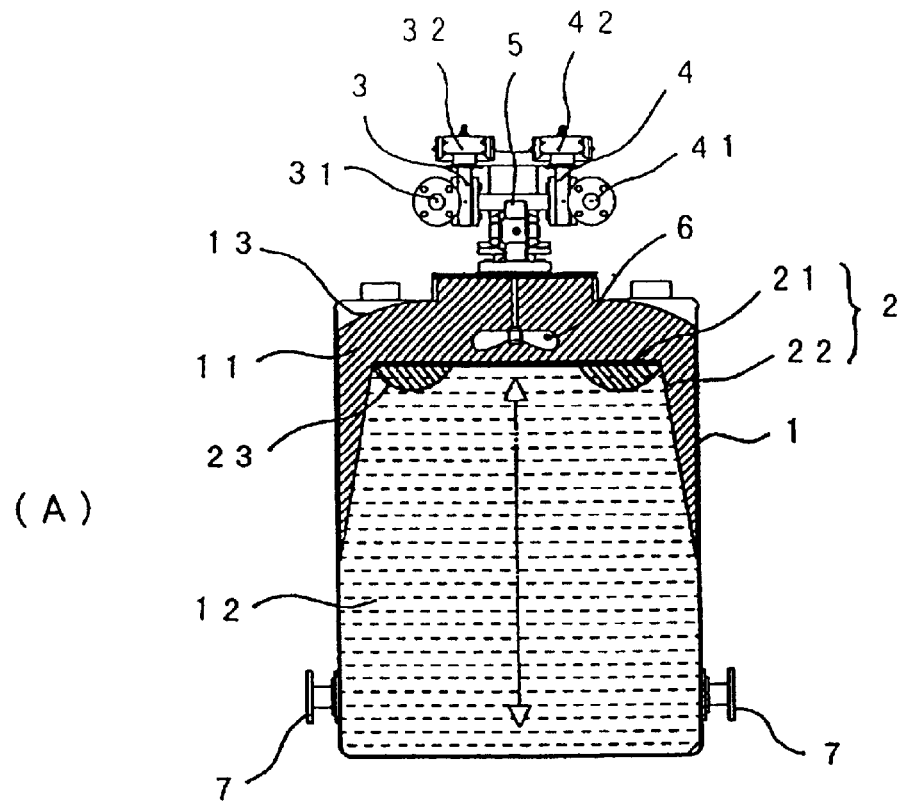
(A)
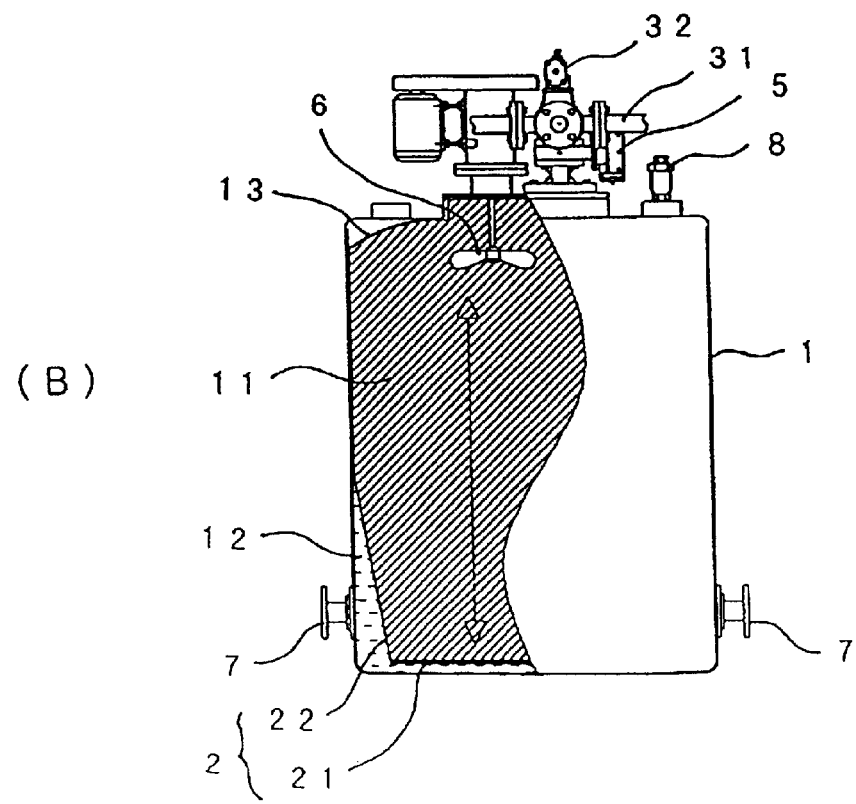
(B)

FIG 11
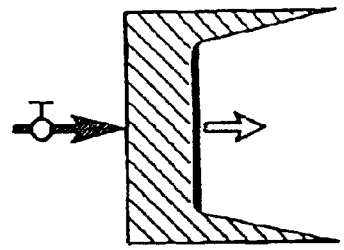
300D
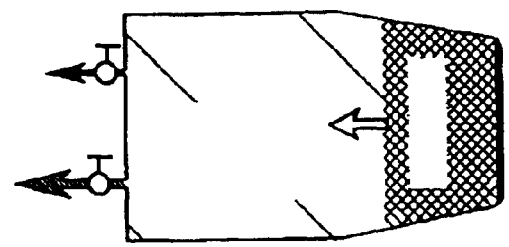
300C
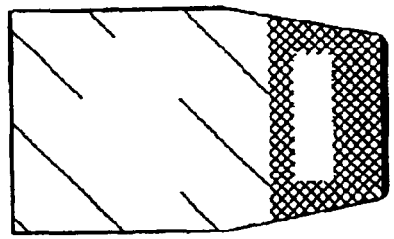
300B
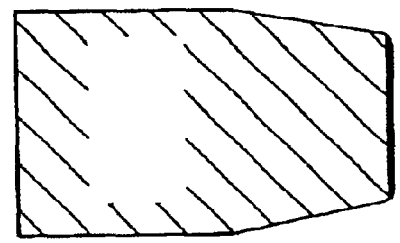
300A

US 6,837,994 B2

WATER TREATMENT APPARATUS

BACKGROUND OF THE INVENTION

1. Field of the Invention

The present invention relates to a water treatment apparatus and a water treatment method, more particularly to a novel water treatment apparatus and method which can process water at low cost in a wide range of applications, such as general factory wastewater, service water, gray water, sewer wastewater, as well as sea, rivers, lakes and marshes, while having the potential to reduce costs substantially.

2. Description of the Related Art

Conventionally, large scale facilities and their related equipment have been necessary for the processing of water, requiring large areas of land and necessitating large scale construction work.

Especially, in the case of purification of a raw water from rivers, lakes and marshes it is necessary to first extract the raw water from the river, lake or marsh by pump to the processing facility established on land, and then having processed the raw water using said processing facility, return the purified water by pump to the river, lake or marsh, thus necessitating high power costs for the transport of water.

SUMMARY OF THE INVENTION

An object of the present invention is to provide a novel water treatment apparatus and method from which a water processing facility can be assembled extremely easily.

And an another object of the present invention is to provide a novel water treatment apparatus and method being of small scale and extremely easy to assemble, and which can process water from a wide range of sources such as sea, rivers and lakes with simple equipment and at low power cost.

The novel features of the present invention are set forth in the appended claims. However, the present invention itself and further objects and advantages thereof will become clearer by the following description of the invention and a preferred embodiment thereof.

BRIEF DESCRIPTION OF THE DRAWINGS

FIG. 1A is frontal section of the water treatment tank,

FIG. 1B is Lateral section of the water treatment tank;

FIGS. 10–13 are diagrams explaining operation of the water treatment apparatus;

DESCRIPTION OF THE INVENTION AND PREFERRED EMBODIMENT

Figure 2:
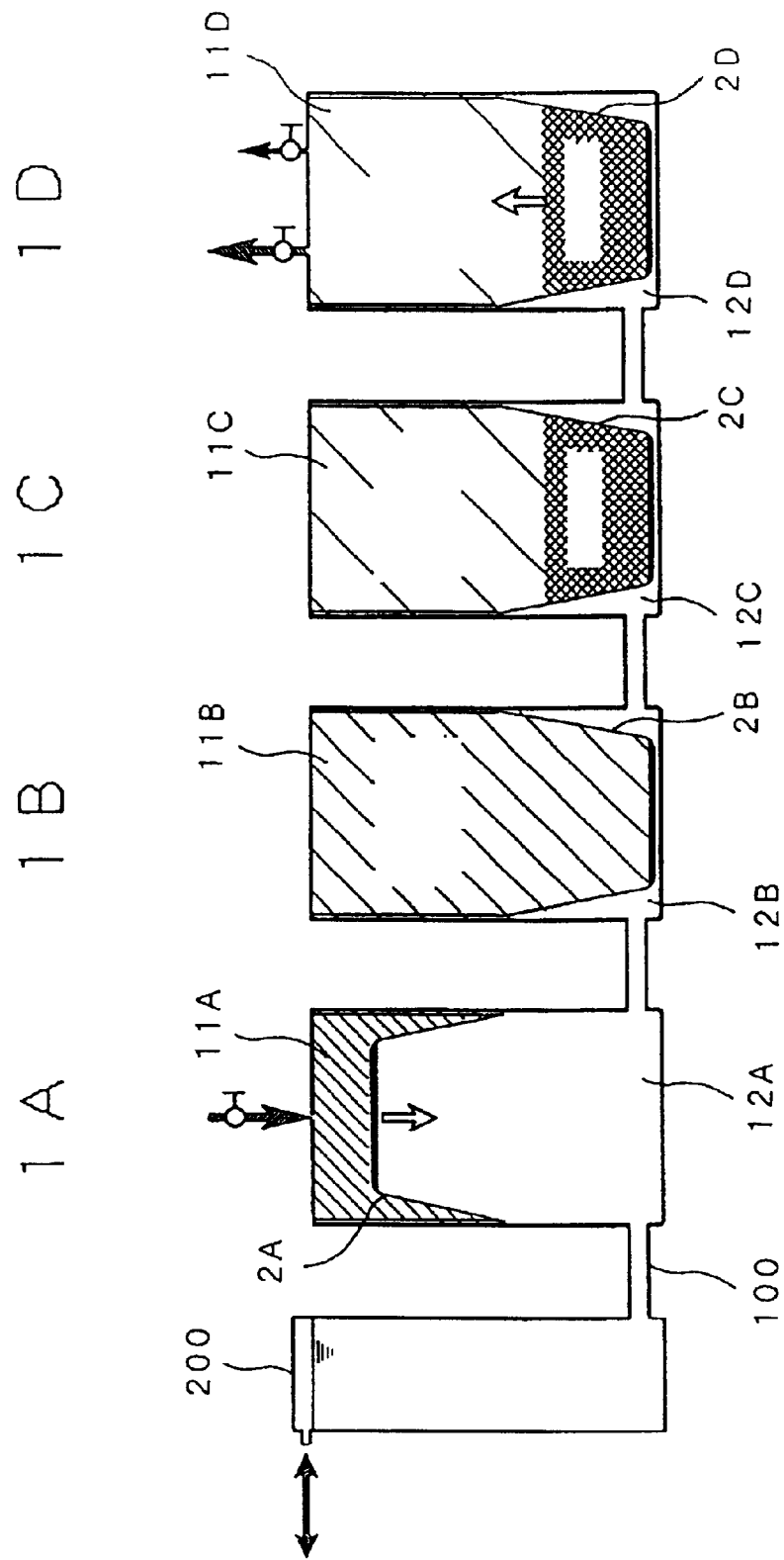
FIGS. 2–5 are explanatory diagrams showing a processing sequence of a water treatment apparatus using the water treatment tank.

This invention will be described in further detail by way of example with reference to the accompanying drawings.

FIG. 1 shows a water treatment tank of the present invention. FIG. 1A is a frontal section, FIG. 1B is a lateral section. The diagrams show the tank in different states of use.

Numeral 1 is a tank, which is an airtight container formed from metallic materials, the surface of which is coated with a fluorine-containing resin coating or a hard vinyl chloride resin coating, stainless steel or synthetic resins such as polyester resins. The form of the lateral section of the tank 1 may be rectangular, or circular, or may take other forms.

Numeral 2 is a separating wall, which creates a division of the tank 1 into two parts, upper and lower, an upper chamber 11 and the lower chamber 12, and consists of a separating wall panel 21 and a flexible sheet 22, which is fitted between said separating wall panel 21 and the tank 1.

The separating wall panel 21 consists of a rectangular or circular flat panel corresponding to the form of the lateral section of the tank 1, the outer diameter of the panel being smaller than the inner diameter of the tank 1 so that there will be a fixed gap between the outer edge of said separating wall panel 21 and the interior surface of the tank 1. Synthetic resins such as a hard vinyl chloride resin, metallic materials such as stainless steel, or metallic materials, the surface of which is coated with a vinyl chloride or fluorine-containing resin coating, may be used as the materials for this separating wall panel 21.

The flexible sheet 22 is made from water resistant and chemical resistant flexible resin materials, such as synthetic polyester fiber, synthetic polyethylene sheet and the like one edge of which is affixed to the perimeter of said separating wall panel 21, the other edge being affixed to the inner surface of the surrounding wall of the tank 1 at roughly middle level height-direction. Further, the flexible sheet 22 forms a gradual sloping surface showing FIG. 1.

The separating wall panel 21 may rise and fall within the tank 1, resulting in two states, one state where the volume of the upper chamber 11 is minimized when the panel is at its highest extent (FIG. 1A) and one state where the volume of the upper chamber 11 is maximized when the panel is at its lowest extent (FIG. 1B).

Therefore, the separating wall 2, consisting of the separating wall panel 21 and the flexible sheet 22, allows alterations in the relative volumes of the upper chamber 11 and the lower chamber 12.

Further, the inner surface of the upper chamber 11 of the tank 1 is covered with a protective sheet 13, which should be of soft synthetic resinous material having water resistance and chemical resistance, preferably a material which is easily joined to said flexible sheet 22, for example a synthetic polyester fiber or synthetic polyester sheet, the lower edge of this protective sheet 13 being joined to one edge of said flexible sheet 22.

Numeral 3 is a raw water inlet, and is connected to a raw water line 31. It is setup so that it is possible to supply raw water to the upper chamber 11 from said raw water line 31.

Numeral 4 is a treated water outlet, and is connected to a treated water line 41. It is set up so that it is possible to expel treated water from the upper chamber 11 through said treated water line 41 to the exterior of the tank 1.

By the use of automatic open-shut valves for a raw water valve 32 and a treated water valve 42, fitted respectively between the raw water inlet 3 and the raw water line 31, and the treated water inlet 4 and the treated water line 41, automatic control of supply of raw water to the upper chamber 11 and expulsion of treated water from the upper chamber 11 is made possible.

Numeral 5 is a isolation valve placed between both the raw water inlet 3 and the treated water outlet 4 and the upper chamber 11. By making said isolation valve 5 an automatic open-shut valve, automatic control of the opening and closing of the water flow between both the raw water inlet 3 and the treated water outlet 4 and the upper chamber 11 is made possible.

Numeral 6 is a stirring device, and is suspended into the upper chamber 11 from the upper part of the tank 1. Said stirring device 6 consists of rotating blades, is operated from a power source located on the upper part of the tank 1, and is capable of stirring raw water in the upper chamber 11 at a fixed speed of revolutions.

Numeral 7 is an inlet-outlet for water for level adjustment, is connected to the lower chamber 12, and adjusts the water level in the lower chamber 12 by introducing water, causing the separating wall panel 21 to be located at its highest position as shown in FIG. 1A, or expelling water from said lower chamber 12, causing the separating wall panel 21 to be located at its lowest position as shown in FIG. 1B. By means of the separating wall panel 21 rising and falling, the separating wall 2 is made to rise and fall, making relative volumes of the upper chamber 11 and lower chamber 12 alterable by use of said separating wall 2.

Inlet-outlets 7 are installed in several places (four in the example figure) on the lower part of the surrounding wall of the tank 1, and it is possible to introduce water for level adjustment into the lower chamber 12 or expel water for level adjustment from said lower chamber 12 by the use of any or all of them.

Further, a floatation adjustment bag 23 is fitted around the upper and/or lower outer edge of the separating wall panel 21, and the buoyancy of the separating wall panel 21 is adjusted by inflation or deflation by means of an air supply/removal device not shown in the figure. By means of this, when causing the separating wall panel 21 to rise as mentioned above, air is introduced into the floatation adjustment bag in order to make use of its buoyancy, and when it is caused to fall, air is appropriately removed, allowing the separating wall panel 21 to fall under its own weight, making possible smooth vertical operation of the separating wall panel 21.

Numeral 8 is an air escape valve which allows air to escape from the upper chamber 11 when raw water is being supplied.

Next, the operation of the water treatment tank pertaining to the present invention will be described.

Firstly, closing a treated water valve 42, and opening the raw water valve 32 and the isolation valve 5, raw water from a raw water line 31 is supplied to the upper chamber 11 from the raw water inlet 3. As this occurs, water for level adjustment is expelled from the lower chamber 12, divided from the upper chamber 11 by the separating wall 2, through the inlet-outlet 7, and supply of raw water to the upper chamber 11 and expulsion of water for level adjustment from the lower chamber 12 are carried out until the separating wall panel 21 is at its minimum level as shown in FIG. 1(b). At this time, it is preferable that the air is removed from the floatation adjustment bag fitted to the separating wall panel 21, causing it to deflate, allowing the smooth descent of the separating wall panel by use of the separating wall panel's own weight.

When the separating wall 2 has fallen to its maximum extent and the upper chamber 11 is filled with the maximum volume of raw water, the raw water valve 32 and the isolation valve 5 are closed, and processing of the raw water is then carried out in the upper chamber 11. Processing of the raw water is carried out by mixing a coagulant and the like with said raw water, and carrying out a stirred flocculation process for a fixed amount of time by rotation of the stirring device 6. Following the stirring process, the stirring device 6 is stopped and allowed to reach a stationary state, the sludge is allowed to precipitate and separate out from the upper, clear treated water in the upper chamber 11.

Following precipitation and separation, the treated water valve 42 and the isolation valve 5 are opened, accompanied by introduction of water for level adjustment to the lower chamber 12 causing the separating wall 2 to rise, raising the level of water in the lower chamber 12. As this occurs, treated water is expelled from the upper chamber 11 through the treated water outlet 4, water for level adjustment is continually introduced into lower chamber 12 until the separating wall panel 21 has reached its highest position as shown in FIG. 1A. By means of the rising movement of the separating wall 2, treated water is expelled from the upper chamber 11 through the treated water outlet 4. At this time, it is preferable that air is supplied to the floatation adjustment bag 23, to inflate it so that smooth vertical movement of the separating wall panel 21 is achieved by use of buoyancy.

Further, following expulsion of the treated water, precipitated excess sludge is removed. At that time, it is preferable to switch over the expulsion line using a valve in tandem with a turbidity sensor and the like to differentiate between the treated water and the sludge.

Next, the process returns to the first step of supplying raw water to the upper chamber 11, followed by repetition of said processing sequence.

In this way according to the water treatment tank related to the present invention, the whole series of processes; supply of raw water, stirred flocculation process, precipitation and separation, and the expulsion of treated water can be carried out using one tank. Thus, large scale purification equipment is unnecessary, equipment installation works are simplified, land area for equipment is greatly reduced, and it becomes extremely simple to assemble the water purification facility.

Also, by adjustment of the water level in the lower chamber 12, whether the position of the separating wall 2 is at its highest or lowest point, the upper chamber 11 and the lower chamber 12 are always filled with water by having raw water or water for level adjustment respectively introduced into them. Thus when the separating wall 2 is at its highest position, as shown in FIG. 1A, the volume of water for level adjustment in the lower chamber 12 is greater than that of the raw water in the upper chamber 11, and when the separating wall 2 is in its lowest position, as shown in FIG. 1B, in contrast, the volume of water for level adjustment in the lower chamber 12 is smaller than that of the raw water in the upper chamber 11, but only the relative volumes of water in the interiors of the two chambers, 11 and 12, varies, and since the total volume of water always fills the tank 1 and is stable in that state, excellent balance is achieved by virtue of its own weight.

In other words, the center of gravity position in the height direction is always fixed, and it, and a vertical load to the ground is always fixed, and moment of rotation doesn't occur in it because the whole is full-filled water even if each water level of the upper chamber and the lower chamber changes. Therefore, it is excellent in a weight balance.

Further, as the tank 1 is airtight, treated water does not come into contact with the atmosphere, there is no adherence of pollutants, and no production of odors, and thus it is possible to maintain a hygienic environment.

Also, since the tank is set up to expel treated water in the upper chamber 11 from the treated water outlet 4 on the upper part of the tank 1 by means of pushing the separating wall 2 up vertically, the clear upper liquid is always expelled first, and it is always possible to extract clear treated water regardless of the amount of sludge present. Further, even in the case that floating constituents which do not easily precipitate, such as oil and the like, are present in the water, differentiating between clear water and contaminants at the time of expulsion by use of a turbidity sensor and the like and using this to switch over a valve, by switching between the treated water line and the sludge line, trouble related to mixing of treated water with contaminants does not easily occur.

Next, an example of a water treatment apparatus using the water treatment tank pertaining to the present invention will be described with reference to FIGS. 2–5.

FIGS. 2–5 show diagrammatic outlines of a water treatment apparatus consisting of four water purification tanks as shown in FIG. 1 linked together. FIGS. 2–5 show one cycle of the process sequence for the whole of the water treatment apparatus. Further, it is preferable for there to be a plurality of water treatment tanks linked in the water treatment apparatus mentioned in the present invention, and is not limited by the four shown in the figure.

Respective lower chambers 12A to 12D of each water treatment tank 1A to 1D are connected together with a pipe 100 making it possible for water level adjusting water to flow between the lower chambers. The water for level adjustment inlet-outlets 7 (see FIG. 1) fitted to each of the water treatment tanks 1A to ID are used when connecting the respective lower chambers 12A to 12D together with the pipe 100. Because the main body of each tank 1 is fitted with a plurality of inlet-outlets 7 it is possible to connect the lower chamber 12 of one water treatment tank with the lower chamber 12 of several other water treatment tanks simultaneously, making it easy to increase the number of tanks linked.

Also, the pipe 100 is linked to one storage tank 200 which contains water for level adjustment, and which is common to each water treatment tank 1A to ID. In this way, it is possible for the water for level adjustment to flow between the storage tank 200 and the lower chambers 12A to 12D.storage tank 200 performs the role of equalizing the amounts of water for level adjustment introduced into the lower chambers 12A to 12D.

Upper chambers 11A to 11D are connected to the raw water line and the treated water line. Thus the upper chambers 11A to 11D can be supplied with raw water, and treated water can be expelled from each of the upper chambers 11A to 11D.

The water treatment apparatus mentioned is set up so that each of the water process tanks 1A to 1D carries out water processing independently, and moreover the timing of the step of the raw water treating sequence is adjusted among each tank.

Namely, taking the sequence in FIG. 2 as an example, lower chamber 12A is filled to capacity with water for level adjustment in water treatment tank 1A, the separating wall 2A is located at its highest position and raw water is about to be supplied to upper chamber 11A; in water treatment tank 1B, the separating wall 2B is located in its lowest position, the upper chamber 11B is filled to capacity with raw water, and coagulant is about to be added and a stirring device rotated to carry out a stirred flocculation process. In a water treatment tank 1C, the stirring device has been stopped and has reached a stationary state, then a coagulated sludge is precipitated and gets treatment water. And in a water treatment tank 1D, a separating wall 2D is about to be raised from its lowest position, expelling the treated water from the upper chamber 11D. Thus processing of raw water is carried out with the timing of the process phases being different for each of the water treatment tanks 1A to 1D.

Figure 3:
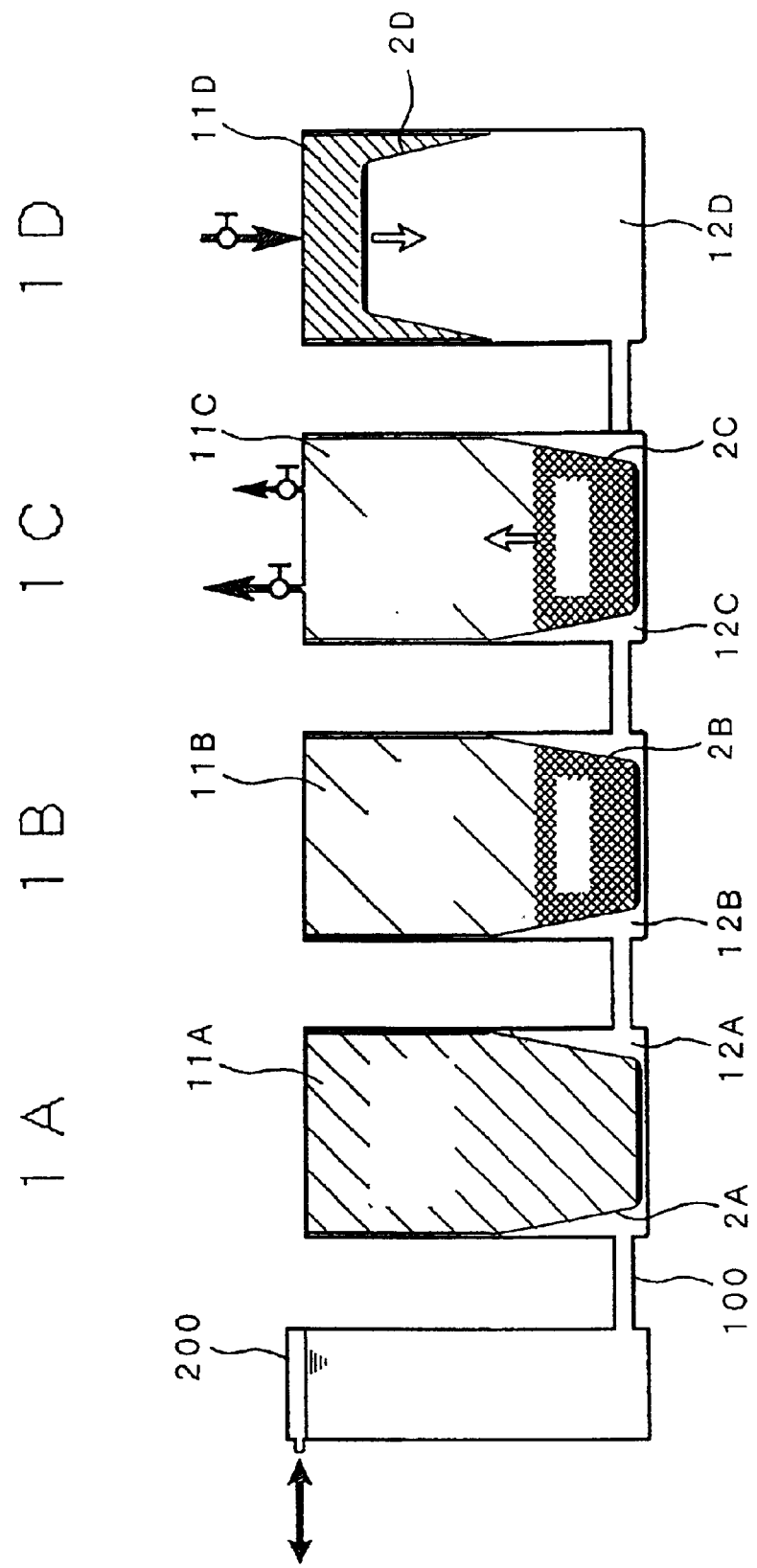

For the said water treatment apparatus, the situation in FIG. 3 is that a water treatment tank 1A is carrying out the stirred flocculation process that was being carried out in a water treatment tank 1B, said water treatment tank 1B is carrying out the precipitation and separation that was being carried out in a water treatment tank 1C in FIG. 2 and said water treatment tank 1C is carrying out the treated water expulsion that was being carried out by 1D in FIG. 2, and said water treatment tank 1D is carrying out the raw water supply that was being carried out by water treatment tank 1A in FIG. 2.

In this case, as raw water is supplied to the upper chamber 1D, the separating wall 2D is lowered and the water for level adjustment is expelled through the pipe 100. At this time, the water treatment tanks 1A and 1B are into a processing phase, and because their isolation valves are in their closed state, the separating walls 2A and 2B cannot rise, water adjustment level water is not taken in lower chambers 12A and 12B through pipe 100, and water for level adjustment is only introduced into a lower chamber 12C, whose treated water valve and isolation valve are open in order to expel treated water. In this way, the separating wall 2C rises, and as it does the treated water is expelled from upper chamber 11C.

Figure 4:
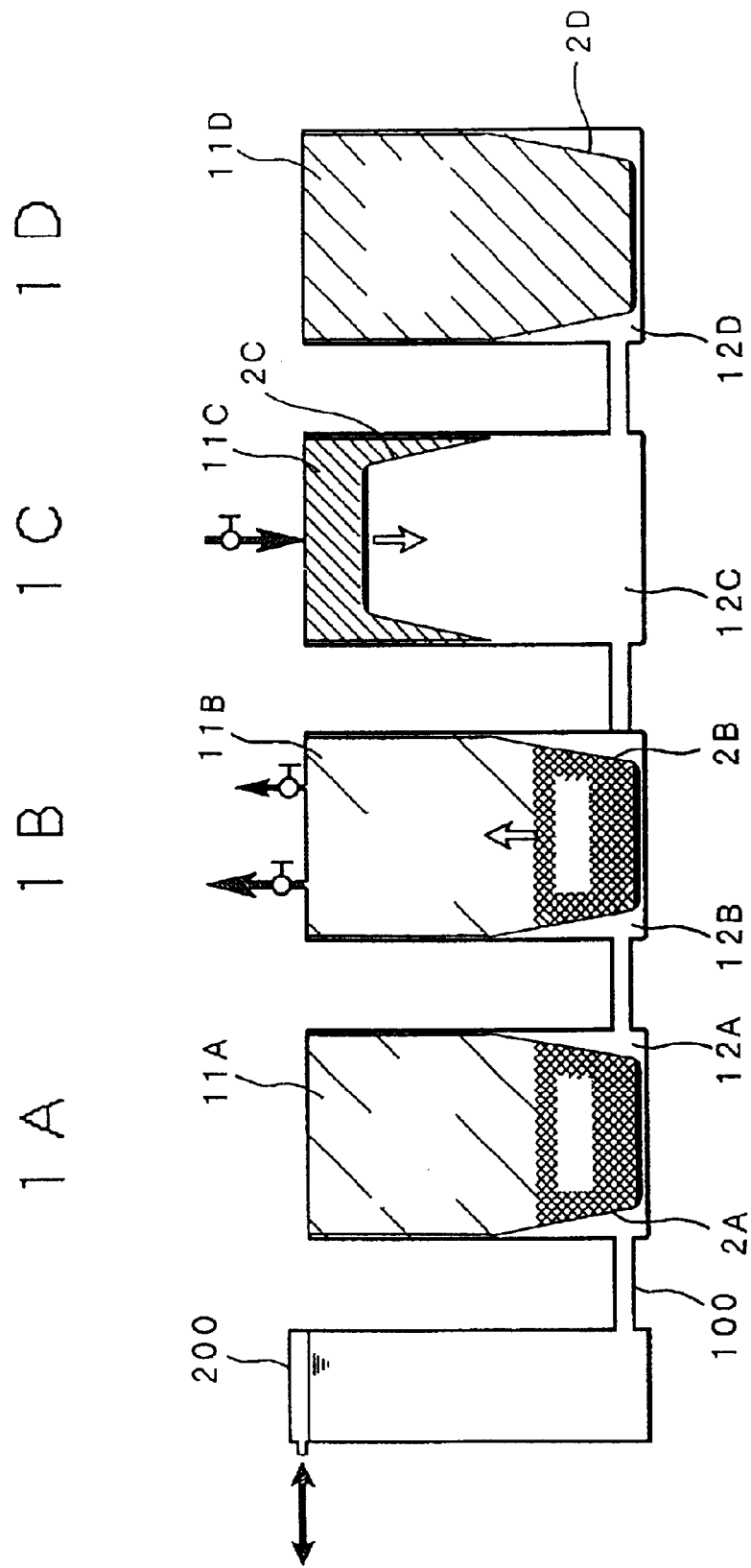

Next, the situation in FIG. 4 is that a water treatment tank 1A is carrying out precipitation and separation, a water treatment tank 1B is expelling a treated water, a water treatment tank 1C introduces a raw water, and a water treatment tank 1D is carrying out the stirred flocculation process. At this time, as mentioned above, the separating wall 2B is rising, and the water for level adjustment is being introduced through the pipe 100 from the lower chamber 12C, from which the water is being expelled.

Figure 5:
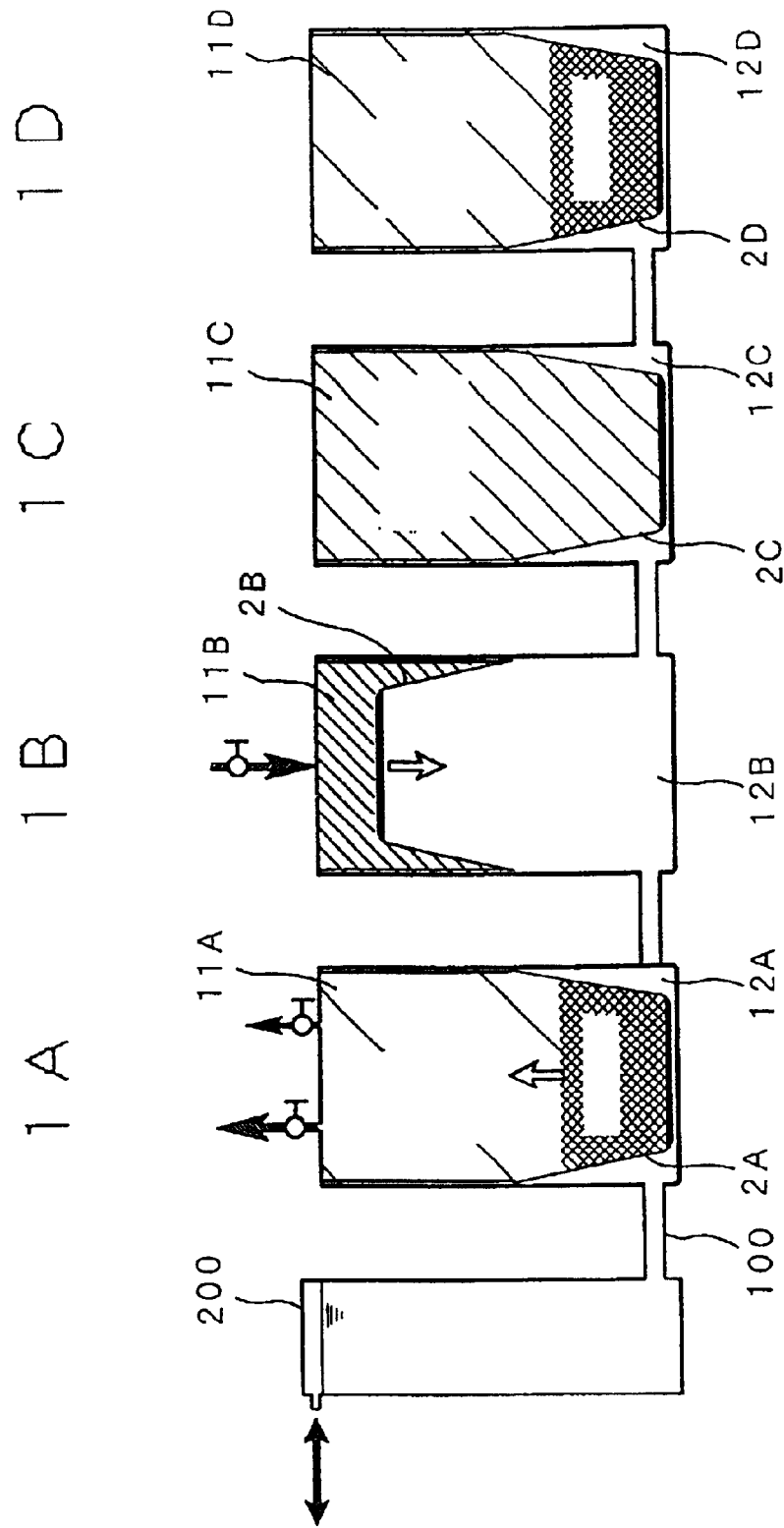

Further, the situation in FIG. 5 is that treated water is being expelled from a water treatment tank 1A, a water treatment tank 1B introduces a raw water, a water treatment tank 1C is carrying out the stirred flocculation process, and a water treatment tank 1D is carrying out precipitation and separation. At this time also, as mentioned above, the separating wall 2A is rising, and water for level adjustment is being introduced through the pipe 100 from the lower chamber 12B, from which the treated water is being expelled.

Following this, the process sequence moves back to FIG. 2 and is repeated as above.

Further, if the volume of water for level adjustment, expelled from the lower chamber of any of the water treatment tanks, is insufficient, or contrastingly overabundant, to raise the separating wall of the other water treatment tanks to the highest level, the balance within the whole system is maintained by providing the water from the storage tank 200 by allowing it to pass through the pipe 100 in the case of insufficiency, or in the case of excess by sending water back to the storage tank 200.

Conventional serial water treatment has serious problem; in the conventional serial water treatment, each of step such as a mix step, a coagulate step, a precipitation-separation step needs own treatment vessel. That is conventional water treatment needs a plurality of treatment vessel. It requires the power to transfer a raw and/or a treating water from one treatment vessel to another treatment vessel. And in the process of transfer a raw and/or a treating water, a stable processing is affected by changes in the water temperature.

Contrastively, the present invention solves the above mentioned problem. The present invention dose not need a plurality of treatment vessel. Therefor, it dose not require the power to transfer a water such as conventional system, and a stable processing is not affected by changes in the water temperature.

Also, only a very small area of land is needed for equipment, and because the equipment can be set up easily by linking water treatment tanks on land, equipment installation works can be carried out easily.

By linking a plurality of water treatment tanks in this way, and by arranging for the timing of the processing sequence to be different in each tank, it is possible to carry out continuous processing of raw water.

Furthermore, because the expulsion of treated water from the upper chamber of each of the water treatment tanks is carried out by use of water for level adjustment being expelled by the downward movement of the separating wall during the supply of raw water to the upper chamber of other water treatment tanks, power to expel the treated water is not especially required, and power costs can be greatly diminished. Thus, wind generators or solar power generators can be used, making it possible to adopt thorough energy saving measures. Due to this, along with the ease of installation, use in areas lacking in electricity supply facilities, or use as emergency water processing equipment in times of disaster, etc. is possible.

Also, processing capacity is easily adjusted by increasing or decreasing the number of water treatment tanks, making it easy to design equipment in accordance with amounts to be treated.

In the above explanation, a flat panel was used for the separating wall panel 21, but it is not limited by this.

For example, although no figure is given, it is also preferable to turn up the outer rim of the panel to form a container-like form with an outer wall, and to affix one edge of the flexible sheet 22 to the perimeter edge of the outer wall. If the container-like separating wall panel is used, since the separating wall panel rises with the sludge precipitated in the lower part of the upper chamber 11 accommodated within the separating wall panel, this separating wall panel is effective in preventing dispersion of the sludge inside the upper chamber 11.

Next, the another enbodyment for carrying out the present invention are described with reference to diagrams.

Figure 6:
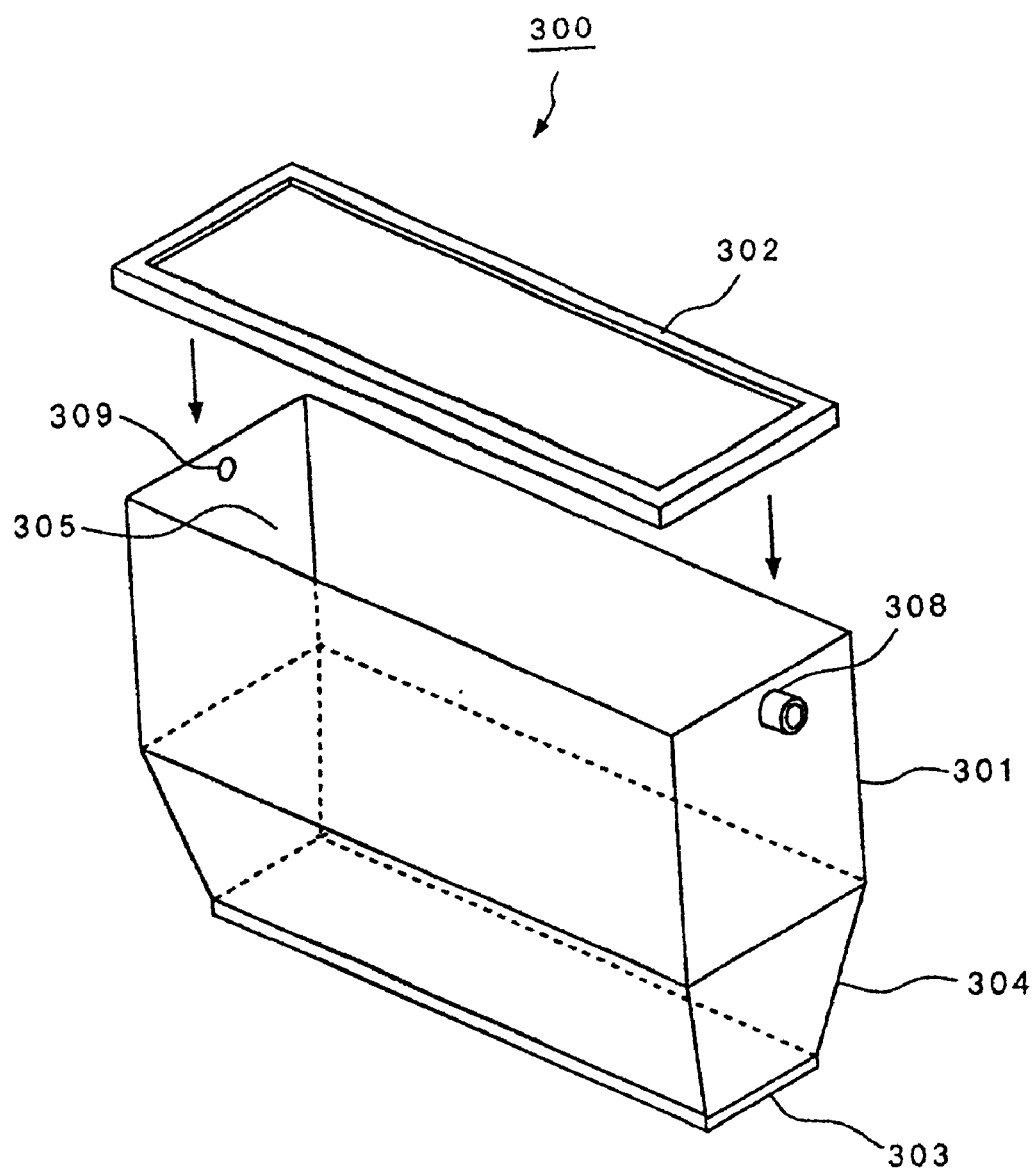
FIG. 6 is exploded oblique perspective showing the structure of the water treatment tank.

FIG. 6 is a perspective diagram showing a water treatment apparatus to the present invention. A water treatment apparatus 300 consists of a planar rectangular surrounding wall 301, to the upper part of which a upper plate 302 is fitted and which forms a lid. To the lower edge of said surrounding wall 301, is fitted a bedplate 303, which is joined to the upper plate 302 by means of a flexible sheet 304. In this way, said upper plate 302, the surrounding wall 301, the bedplate 303 and the flexible sheet 304 surround and form a water processing chamber 305.

The surrounding wall 301 is a surrounding surface, open at the upper and lower end, which is formed by stretching wall material over a frame assembled by the use of vinyl chloride piping and the like, and which forms the wall of the upper half of the water processing chamber. As will be stated below, since the water treatment apparatus 300 is used by immersing it in the water to be processed, it is necessary that the materials making up the wall surface are be capable of maintaining water-tightness, and also have excellent water resistance properties. For example, vinyl chloride resin sheet, polyester resin sheet, polyethylene resin sheet and the like, and in addition layered sheet using these resin sheets may also be used.

Further, it is preferable that the surrounding wall 301 is formed using a floatation bag that can be filled with air in its interior, or a water bag that can be filled with water in its interior, and in this way the surrounding wall 301 itself will float in the water so that even if there is a vertical change in the water surface position due to an increase or decrease of the water level of the water to be processed, the water treatment apparatus 300 will move up or down in accordance with the water level due to the buoyancy of the surrounding wall 301, thus eliminating any trouble that might arise from having to continually alter the installation position in accordance with the water level.

As for said floatation bag and water bag, these may form the wall surface in the frame by using vinyl chloride and the like flexible sheet to form bag material and then filling this with water or air, or to surround the frame with pipe-shaped bag material formed from flexible sheet in the same way as mentioned above, and then filling this with water or air, and resin sheet of some appropriate wall material may be stretched between the air bags or water bags.

The upper plate 302 forms a lid for the upper part of the surrounding wall 301. This upper plate 302 cuts off contact between the treated water in the water treatment chamber 305 and the outer raw water (water to be processed), and as well as ensuring that refuse and other foreign objects do not enter the water treatment chamber 305, prevents the escape of odors, and maintains a hygienic environment. From the point of view of giving lightness of weight and buoyancy to this upper plate 302, it can be formed from a floatation bag filled with air in the interior, or can be formed from foamed synthetic resin material formed into a panel shape.

The bedplate 303, is formed as a flat panel roughly the same shape as the planar form of the surrounding wall 301, and is made to be slightly smaller than the planar form of the said surrounding wall 301. For the material for the bedplate 303, hard vinyl chloride and the like synthetic resin board, stainless steel and the like, and metal plate and the like may be used. Metallic plate may also have a surface coating of vinyl chloride or fluoride resin.

Figure 7:
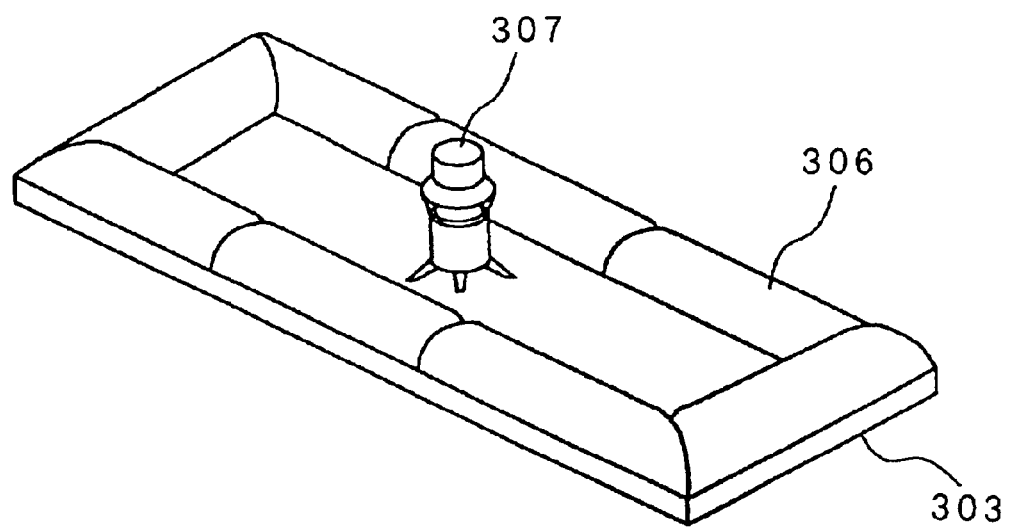
FIG. 7 is oblique perspective showing the structure of the bedplate.

The bedplate 303, as shown in FIG. 7, is fitted with a floatation adjustment bag 306. The floatation adjustment bag 306 is connected to an air supply/removal device not shown in the figure, and can be inflated or deflated by means of air supply or removal operations of said air supply/removal device. Since this bedplate, as will be stated below, is located below the surface of the water to be processed, it is given buoyancy by inflation of the floatation adjustment bag 306, and rises in the water due to that buoyancy. At the time of this rising movement, since the bedplate 303 is formed to be slightly smaller than the planar form of the surrounding wall 301, it is accommodated within the surrounding wall 301 such that there exists a slight gap between the inner surface of the surrounding wall 301 and the bedplate 303 (see the situation in 300A in FIG. 10). Further, deflation of the floatation adjustment bag 306 will cause the bedplate 303 to fall through the water under its own weight to the state shown in FIG. 6.

The floatation adjustment bag 306 shown in the figure is fitted to the upper surface of the bedplate 303, but it may also be fitted to the lower surface, or to both the upper and lower surfaces. Further, in the form shown in the figure, the floatation adjustment bag 306 forms a doughnut shape roughly in the visual plane conforming to the outer rim of the bedplate 303, but the planar form is arbitrary.

A stirring device 307 is fitted roughly above the center of the upper surface of the bedplate 303, and is capable of stirring the treated water in the water processing chamber 305 at a fixed speed. An immersible water mixer is used for the stirring device 307.

A flexible sheet 304 is stretched between the lower edge of the surrounding wall 301 and the outer rim of said bedplate 303, thus forming the lower half of the wall surface of the water processing chamber 305. This flexible sheet 304 is flexible in its own right and so easily bends. Because of this, it is possible for the bedplate 303, which is connected to the lower edge of the flexible sheet 304, to rise and fall by inflation or deflation of the floatation adjustment bag 306, as mentioned above. For the materials for the flexible sheet 304, soft synthetic resin material having water resistance and chemical resistance, for example synthetic polyester sheet, synthetic polyethylene sheet and the like may be used.

Further, the bedplate 303 is not limited by the flat panel shown in the figure. For example, although not shown in the figure, it is also acceptable to turn up the outer rim of the flat panel to form a container-like shape with a side wall, and then connect the flexible sheet to the outer rim of the side wall of this container-like shaped bedplate. In this way, because the bedplate rises with sludge precipitated to the lower part of the water processing chamber 305 accommodated within the bedplate, the (container-like) bedplate 303 is effective in preventing dispersion of the sludge inside the water processing chamber.

Further, in order to achieve the same object, although not shown in the figure, it is preferable to fit a floatation adjustment bag on the upper part of the bedplate 303 such that it surrounds the outer perimeter of the flexible sheet 304, leaves a gap between itself and the bedplate 303, and such that when the bedplate 303 rises due to inflation of the floatation adjustment bag, the flexible sheet 304 that is fitted to the floatation adjustment bag and the bedplate 303 are able to enclose the sludge that has precipitated to the lower part of the water processing chamber 305.

In FIG. 6, 308 is a raw water inlet that introduces raw water into the water processing chamber 305, and is fitted to the upper part of the surrounding wall 301. 309 is a treated water outlet through which is expelled treated water to the outside from the water processing chamber 305, and is fitted to the upper part of the surrounding wall 301 in an opposite position on the wall surface to said raw water inlet 308.

Figure 8:
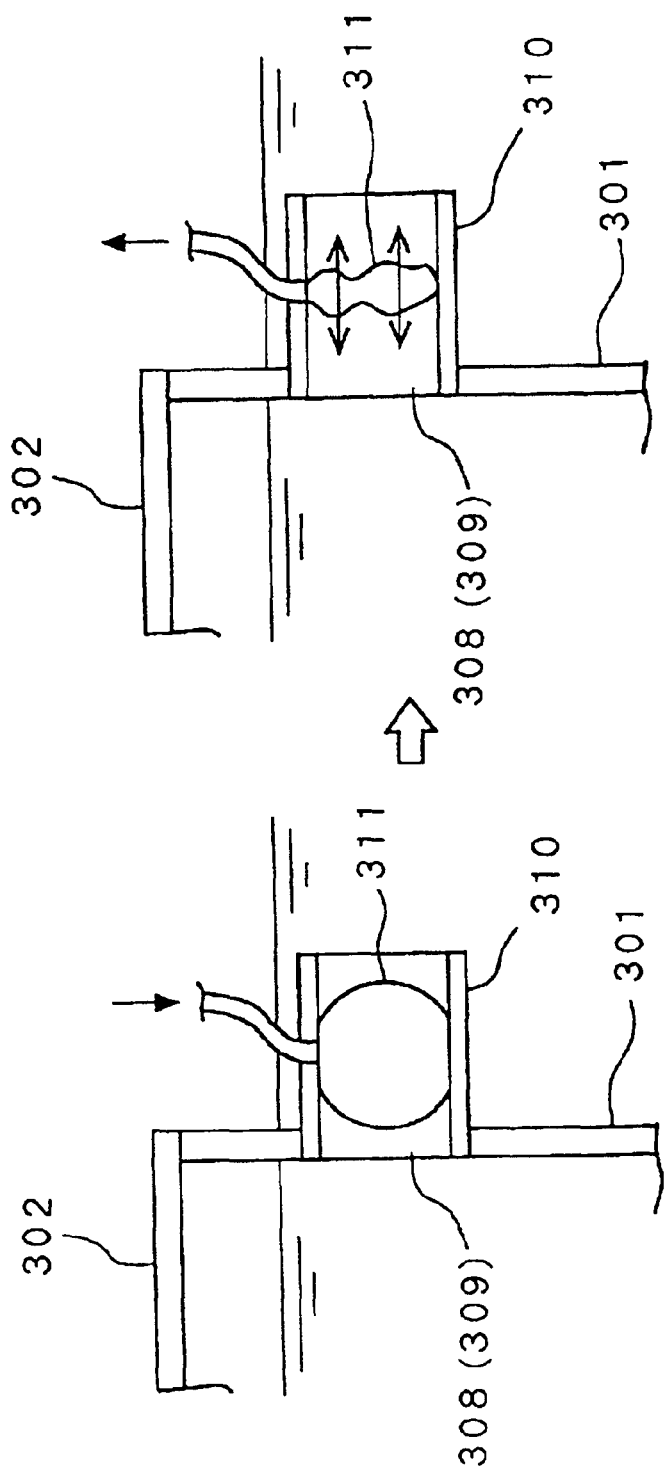
FIG. 8 is sections showing example structures of a raw water inlet and treated water outlet.

The opening and closing of the raw water inlet 308 and the treated water outlet 309, for example as shown in FIG. 8, can be carried out by inserting a valve bag 311 that can be inflated or deflated by supplying or withdrawing air by use of an air supply/removal device that is not shown into a tubular part 310 of the raw water inlet 308 and the treated water outlet 309 to form an open-shut valve, which by inflating said valve bag 311 closes off the tubular part 310 blocking the flow of the raw water or treated water, or by deflating it causes a gap to form between the inner surface of the tubular part 310 and the outer surface of the valve bag 311, making it possible for the raw water or treated water to flow. For this air supply/removal means, it is preferable to use the same air supply/removal means as is used to supply air to or remove air from the floatation adjustment bag 306.

When using said water treatment apparatus 300, water processing of the water to be processed is carried out by immersion of the surrounding wall 301, the raw water inlet 308 and the treated water outlet 309 in the water to be processed roughly at the surface level of the water to be processed.

As examples of the water to be processed here, service water, gray water, sewer wastewater, industrial wastewater, river, lake and marsh water, and sea water may be mentioned. Further, as for "lake and marsh," this is not limited to lakes and marshes, but may also include ponds and channels.

In addition, water processing in the present invention can be taken to mean the purification of service water, gray water, sewer wastewater, industrial wastewater, river, lake and marsh water, a preparatory process for the desalinization of sea water and the like, and the water treatment apparatus 300 pertaining to the present invention functions effectively when carrying out such processing.

Further, in the water processing, in the case where a concrete and so on water tank can be established, clear water balance water may be placed in the water tank, and a water treatment apparatus 300 may be immersed in that clear water balance water, raw water supplied to the water processing chamber 305 of the water treatment apparatus, and treated water expelled from the water processing chamber 305.

In order to carry out the processing mentioned, although it is acceptable to use a single water processing unit 300 as pertains to the present invention, it is preferable to use a plurality of units, in accordance with the amount of water to be processed, linked together so that the raw water inlets 308 and the treated water outlets 309 for each are all on the same side. In this way, it is easy to cope with an increased amount of water to be processed by simply increasing the number of water treatment apparatuss 300 linked together. Further, in FIG. 9, an example is shown where four water treatment apparatus 300A to 300D are linked together, but there is no limitation whatsoever imposed on the number of units that can be linked. Also, as shown in the figure, water treatment apparatus may be physically in contact with each other, or they may be arranged such that there exists a slight gap between them. 308A to 308D show the raw water inlets for the respective water treatment apparatus 300A to 300D. Also, 312 is an anchor to which the whole system of water treatment apparatus 300A to 300D is moored.

Figure 9:
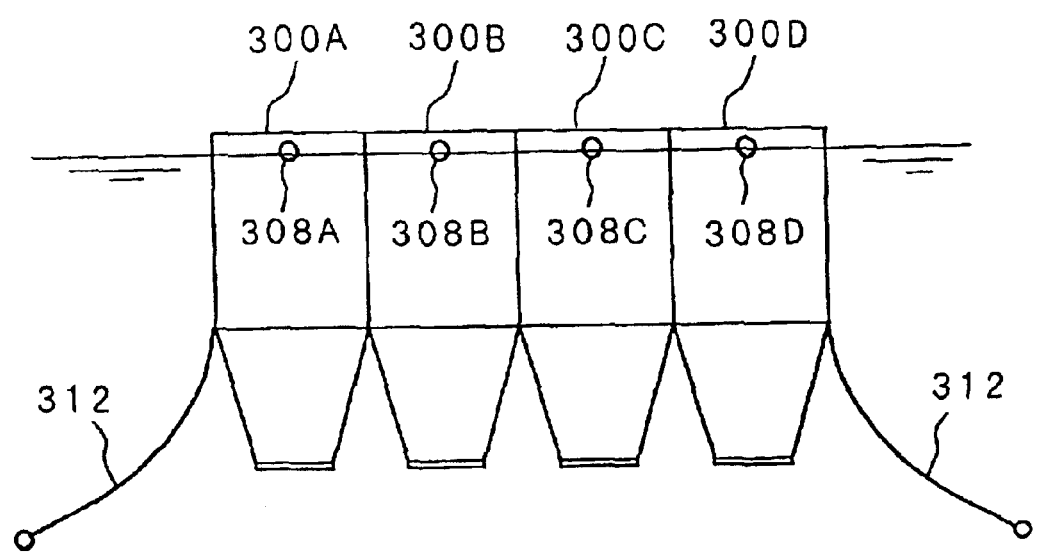
FIG. 9 is elevation showing an example of the use of the water treatment apparatus.

In FIGS. 10–13, operation of the water treatment apparatus 300 is explained by taking the case of removal of suspended solids from the water. In this figure, four water treatment apparatus 300A to 300D, as shown in FIG. 9, are shown, but since the operation is the same for each device, the explanation will be carried out with reference to water treatment apparatus 300A as representative. Further, the processing operation of each of the apparatus 300A to 300D will be carried out in accordance with the order (from top to bottom) of FIGS. 10–13 in the figure.

Figure 10:
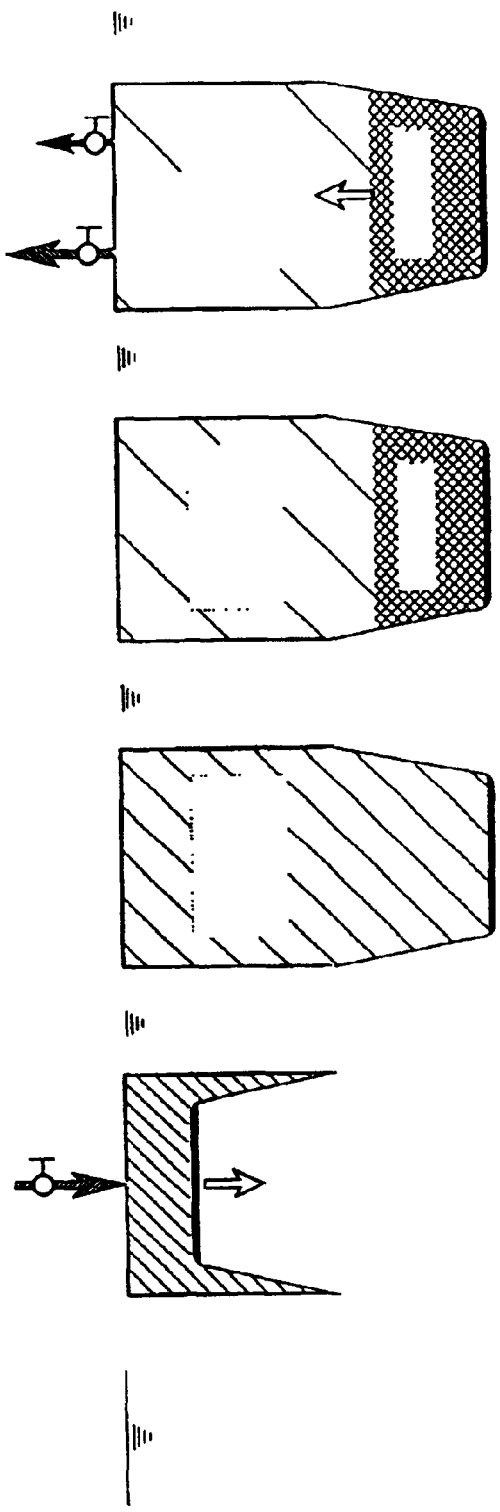

First, the raw water inlet 308 is opened to allow raw water to flow into the water processing chamber 305. At this point, since the bedplate 303 has risen to its highest position in the water processing chamber 305, air filling the floatation adjustment bag 306 on the bedplate 303 is withdrawn, causing the bedplate 303 to fall under its own weight, increasing the internal volume of the water processing chamber 305 to accommodate the raw water (FIG. 10).

When the bedplate 303 has fallen to its lowest position and the water processing chamber 305 is filled with raw water to its maximum volume of water, the raw water inlet 308 is closed and processing takes place. The processing of raw water takes place by power rotating the stirring device 307 to carry out the stirred flocculation process for a fixed amount of time (FIG. 11). In this stirring process, it is acceptable to supply the coagulant from the raw water inlet 308 simultaneously with the introduction of the raw water.

Figure 12:
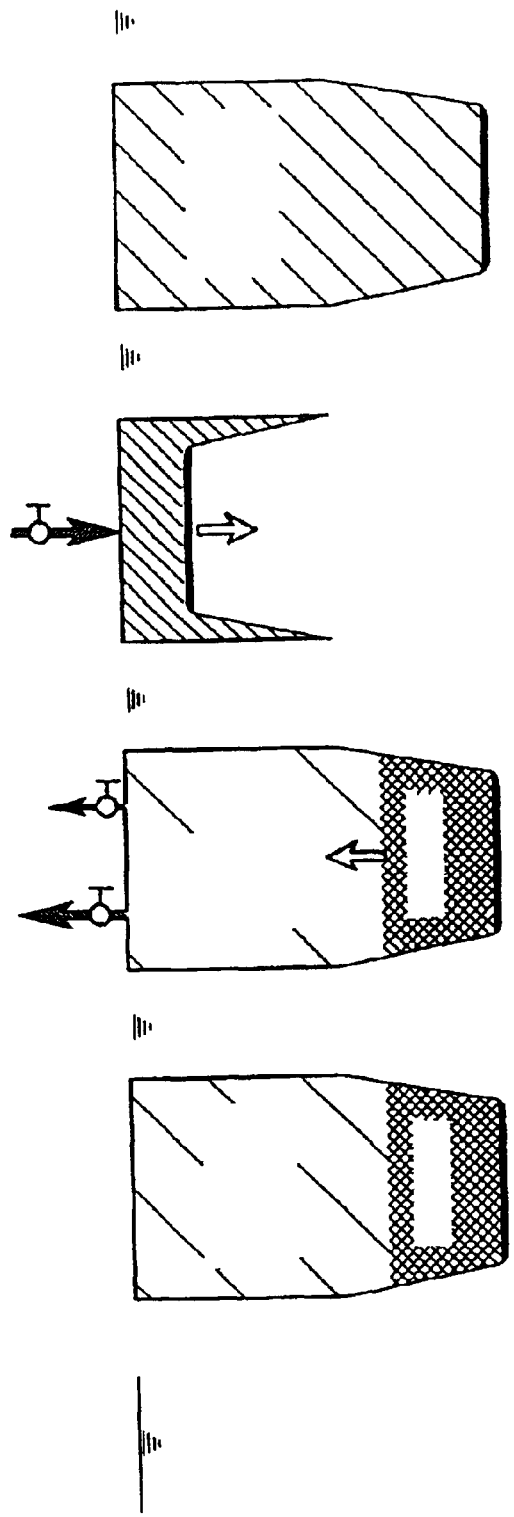

Following the fixed time for the stirring process, the stirring device 308 is stopped and allowed to come to a stationary state, the sludge from the raw water precipitating out and separating from the upper clear treated water (FIG. 12).

Figure 13:
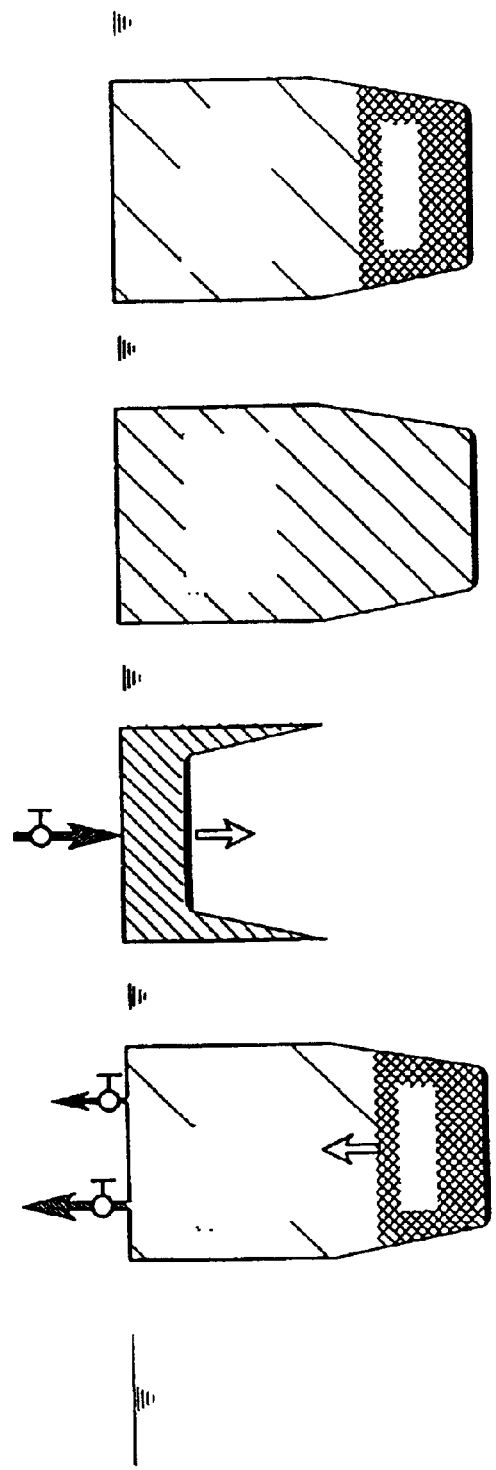

Following precipitation and separation, the treated water outlet is opened to allow the treated water to flow out, the bedplate 303 is given buoyancy by filling the floatation adjustment bag fitted to the bedplate 303 with air, and causing the bedplate 303 to rise within the water processing chamber 305 by use of said buoyancy (FIG. 13). As the bedplate 303 rises, treated water (upper clear water) in the water processing chamber 305 is expelled to the outside from treated water outlet 309, and expulsion of the treated water continues until the bedplate reaches its highest position. At this time, since the treated water is expelled through the pushing up from below of the rising bedplate 303, the upper clear treated water is always expelled first and clear, treated water is always expelled regardless of the amount of sludge precipitated. Following the expulsion of the treated water, the precipitated sludge is removed.

Next, the treated water outlet 309 is closed, the raw water inlet is opened to allow water to flow, thereafter repeating said sequence.

In this way, according to the water treatment apparatus 300 pertaining to the present invention, the series of processing operations from supply of the raw water, stirring operation, precipitation and separation, to expulsion of the treated water can be carried out directly in the water to be processed. Thus, large scale processing equipment is unnecessary, and equipment installation works can be simplified. Furthermore, since processing is carried out by direct immersion in the water to be processed, then it can be carried out without the necessity for a place for facilities on land. Also, the rising and falling movement of the bedplate 303 for the introduction of raw water and the expulsion of treated water takes place simply by the momentary operations of supplying or removing air from the floatation adjustment bag 306, and since there is no continual use of a pump and the like as a means of transportation, power costs can be greatly reduced, and as a result wind generators or solar power generators can be employed, creating the possibility of adopting thorough energy saving measures. Because of this, as well as being easy to set up, use in areas which do not have electrical power generation facilities is also possible.

Further, as in FIGS. 10–13, when a plurality of water treatment apparatus are linked together, it is preferable to carry out processing by differing the timing of the sequence of operations for each apparatus 300A to 300D. Namely, as in the situation in FIG. 10, when raw water is being supplied to a water treatment apparatus 300A, a stirred flocculation process of raw water is being carried out in a water treatment apparatus 300B, in water treatment apparatus 300C the precipitation and separation process is being carried out in a stationary state, in water treatment apparatus 300D treated water is being expelled, and hereafter in the steps in FIG. 11 to FIG. 13, processing is carried out with the sequence timing of each of the water treatment apparatus 300A to 300D being different. In this way, it is necessary only for an air supply/removal means (not shown in the diagram) to be carrying out an air supply or removal operation for the floatation adjustment bag 306 on the bedplate 303 in just one of the water treatment apparatus, and because it is not necessary to be carrying out the air supply or removal operation for the floatation adjustment bag 306 on the bedplate 303 for all the water treatment apparatus simultaneously, the power for compressor, etc. for supply and removal of air does not have to be particularly large, and is thus even more effective for energy saving measures.

Figure 14:
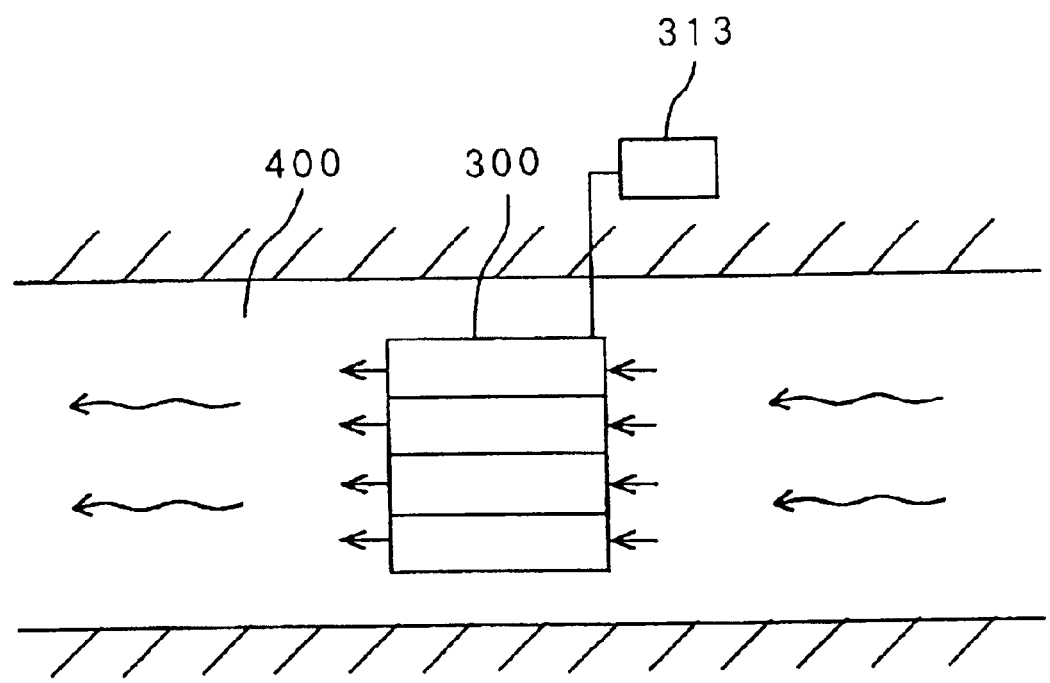
FIG. 14 is diagram showing an example application of the water treatment apparatus.

The water treatment apparatus 300 pertaining to the present invention, as shown in FIG. 14, by immersion in the water of a river 400 with a raw water inlet positioned in the upstream side can be used to carry out the processing of water in the river 400. Namely, after introducing and processing raw water from the river 400 in the water treatment apparatus 300, and releasing the treated water again in the downstream direction, it is possible to reduce the concentration of suspended solids in the downstream direction compared to that in the upstream water. Taking the plurality of water treatment apparatus 300 linked together as one unit, deploying a plurality of units at intervals along the direction of flow of the river 400 will be even more effective in purifying the water of the river 400. Further, in the figure, 313 is a control unit situated on land, which includes an air supply/removal means, and which controls air supply to and air removal from the floatation adjustment bag 306 on the bedplate 303 and also to and from the valve bags 311 in the raw water inlet 308 and the treated water outlet 309.

Figure 15:
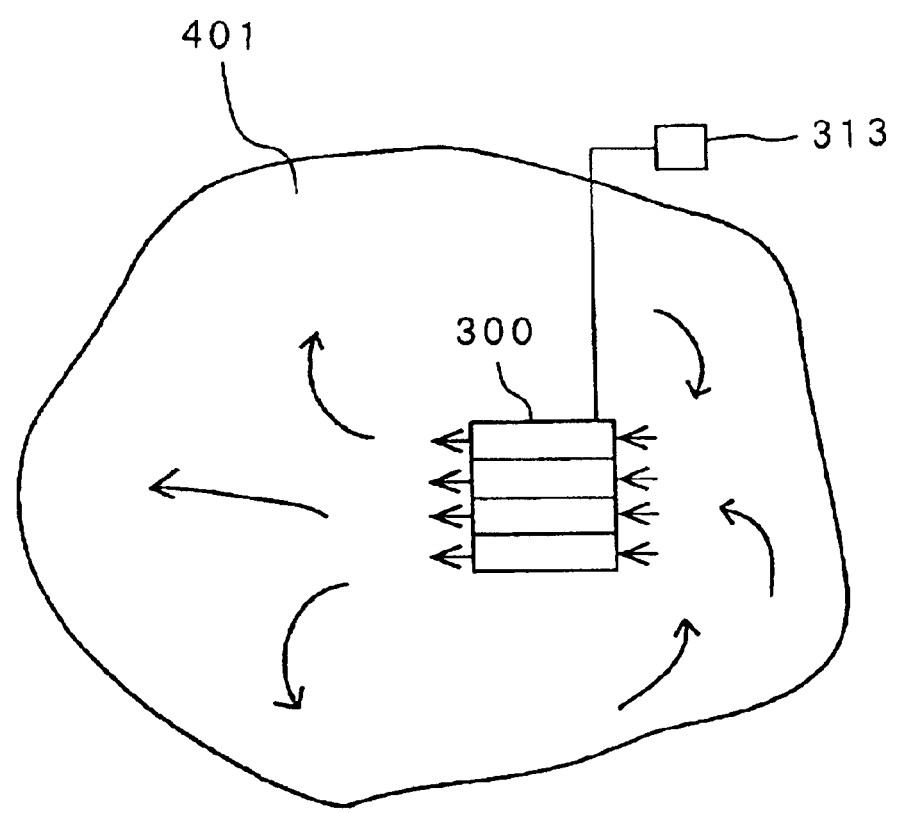
FIG. 15 is diagram showing an example application of the water treatment apparatus.

FIG. 15 shows water treatment apparatus 1 when deployed in a lake or marsh 401. Water treatment apparatus 300 is immersed in the water of the lake or marsh 401, and introducing and processing raw water from said lake or marsh 401 in the water treatment apparatus 300, and by releasing the treated water again into the lake or marsh 401, it is possible to gradually reduce the concentration of suspended solids in the water of the lake or marsh 401. Taking a plurality of water treatment apparatus 300 linked together as one unit, it is also possible to deploy a plurality of units in accordance with the area of the lake or marsh 401.

Figure 16:
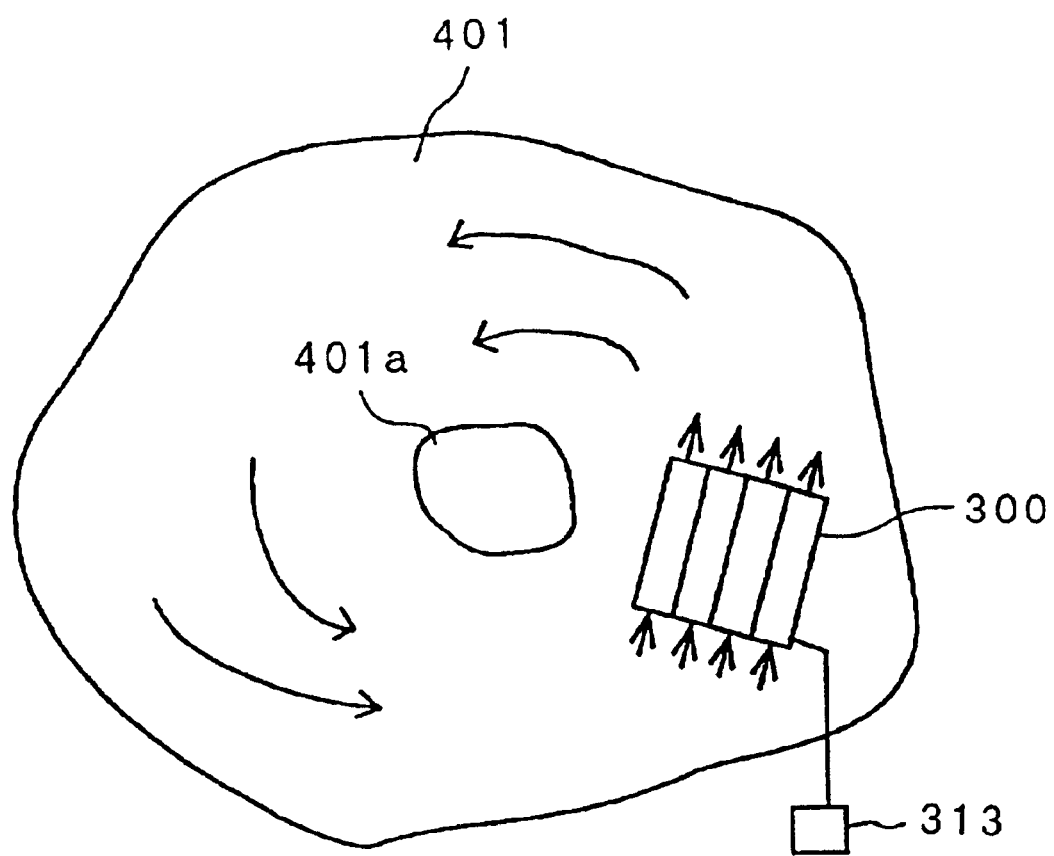
FIG. 16 is diagram showing an example application of the water treatment apparatus.

In the case where the lake or marsh 401, for example as shown in FIG. 16, has a central island 401a and the like by use of a water treatment apparatus 300, said water treatment apparatus can divide the lake or marsh 401 into an unprocessed side and a processed side, making effective processing possible. It is also possible to carry out effective processing of channels in this way.

Figure 17:
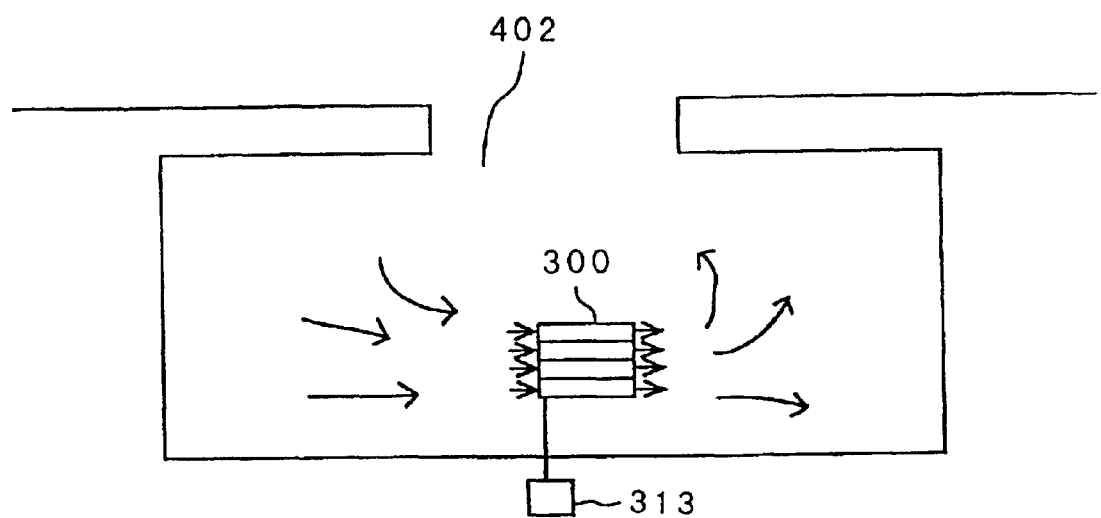
FIG. 17 is diagram showing an example application of the water treatment apparatus.

FIG. 17 shows water treatment apparatus 1 when deployed in a harbor area 402 of the sea. A water treatment apparatus 300 is immersed in the water of the harbor area 402, and introducing and processing raw water from said harbor area 402 in the water treatment apparatus 300, and by releasing the treated water again into the harbor area 402, it is possible to gradually reduce the concentration of suspended solids in the water of the harbor area 402. Taking a plurality of water treatment apparatus 300 linked together as one unit, it is also possible to deploy a plurality of units in accordance with the area of the harbor area 402.

Figure 18:
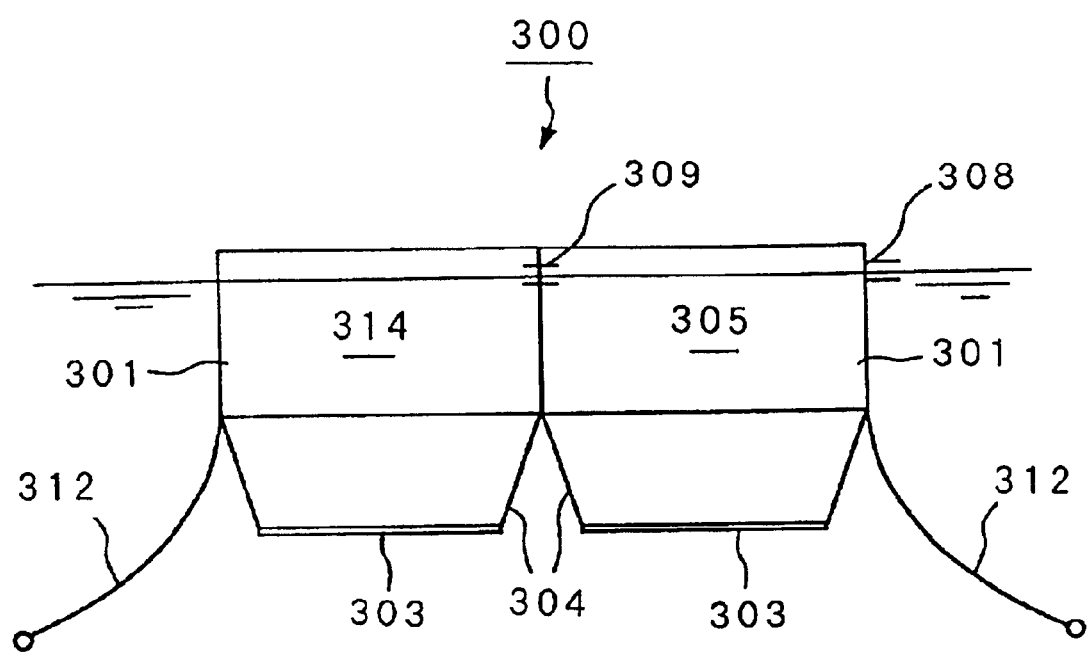
FIG. 18 is profile showing a different configuration of the water treatment apparatus in use.

FIG. 18 shows a lateral view of a different configuration of water treatment apparatus 1. In this configuration, the surrounding wall 301 forming the water processing chamber 305 is in contact on the side of the treated water outlet 309 with a treated water storage chamber 314 for storing treated water which has been expelled.

This treated water storage chamber 314 is structured from a surrounding wall 301, an upper plate 302, a bedplate 303 and a flexible sheet in the identical structure of said water processing chamber 305, and is fitted together with said water processing chamber 305 and similarly immersed in the water to be processed and temporarily stores treated water which it receives from the water processing chamber 305. The treated water stored in the treated water storage chamber 314 can be removed as necessary and can be transported to a different processing facility for further processing, or made effective use of as gray water.

Further, in the above explanation, the case where the water treatment apparatus 300 is immersed directly in the water to be processed has been explained, and although not shown in a figure, in the case where a concrete and the like water tank is established, clear water can be stored in the water tank, and it is preferable that the water treatment apparatus 300 be immersed in this clear water. In this case, introduction of treated water into the water processing chamber 305 of the water treatment apparatus 300, removal of the treated water and excess sludge from the water processing chamber, in the same way as in said water treatment tank, connecting pipes, etc. directly to the raw water inlet 308 and the treated water outlet 309, the amount of flow can be adjusted by use of a pump.

Also, the above explanation was carried out with reference to carrying out the processing by mixing coagulant with the raw water, but it is also possible to carry out the processing of raw water by the use of activated sludge.

In addition, the planar form of the water treatment apparatus 300 is not limited a rectangular form, it may be circular and the like in form, and this is arbitrary.

What is claimed:

1. A water treatment apparatus comprising:
at least one airtight tank having a raw water inlet and a treated water outlet, wherein the airtight tank is always filled with water separating wall, a separating wall connected to the interior surface of the tank and dividing said tank into a first chamber and a second chamber, said separating wall moves within said tank responsive to a water level in the second chamber to control a water level of the first chamber; said tank having at least one inlet and one outlet fitted on the second chamber for water level adjustment;
wherein the separating wall is formed of a multi-annular shaped or circular shaped separating wall panel and a flexible sheet.

2. A water treatment apparatus according to claim 1, wherein the flexible sheet is connected to the separating wall panel and the interior surface of the tank.

3. A water treatment apparatus according to claim 1 which comprises a stirring device which is disposed inside said tank.

4. A water treatment apparatus according to claim 1 wherein a floatation adjustment bag is fitted to the lowest part of the separating wall.

5. A water treatment apparatus according to claim 1 wherein a floatation adjustment bag is fitted to the separating wall.

6. A water treatment apparatus according to claim 5, further comprising a means for supplying and removing air from said floatation adjustment bag.

7. A water treatment apparatus according to claim 1 further comprising a plurality of airtight tanks.

8. A water treatment apparatus according to claim 7, wherein the second chambers of each of the tanks are linked such that water can flow between the second chambers of the tanks.

9. A water treatment apparatus according to claim 7 wherein the first chambers are linked to a storage tank.

* * * * *